United States Patent
Deck et al.

(10) Patent No.: US 6,643,024 B2
(45) Date of Patent: Nov. 4, 2003

(54) APPARATUS AND METHOD(S) FOR REDUCING THE EFFECTS OF COHERENT ARTIFACTS IN AN INTERFEROMETER

(75) Inventors: Leslie L. Deck, Middletown, CT (US); David Stephenson, Madison, CT (US); Edward J. Gratix, Monroe, CT (US); Carl A. Zanoni, Middlefield, CT (US)

(73) Assignee: Zygo Corporation, Middlefield, CT (US)

( * ) Notice: Subject to any disclaimer, the term of this patent is extended or adjusted under 35 U.S.C. 154(b) by 350 days.

(21) Appl. No.: 09/848,055

(22) Filed: May 3, 2001

(65) Prior Publication Data

US 2003/0043380 A1 Mar. 6, 2003

(51) Int. Cl.[7] ................................................. G01B 9/02
(52) U.S. Cl. ........................................ 356/496; 356/450
(58) Field of Search .............................. 356/450, 496, 356/498, 503, 504, 505, 513, 515

(56) References Cited

U.S. PATENT DOCUMENTS

| | | |
|---|---|---|
| 4,325,637 A | 4/1982 | Moore |
| 4,732,483 A | 3/1988 | Biegen |
| 4,743,117 A | 5/1988 | Kitabayashi et al. |
| 5,357,341 A | 10/1994 | Kuechel et al. |
| 5,737,081 A | 4/1998 | Freischlad |
| 5,760,902 A | 6/1998 | Brody |
| 6,028,670 A | 2/2000 | Deck |
| 6,031,612 A | 2/2000 | Shirley |
| 6,061,133 A | 5/2000 | Freischlad |
| 6,226,092 B1 | 5/2001 | De Lega |

FOREIGN PATENT DOCUMENTS

DE  42 33 336 A  4/1994

OTHER PUBLICATIONS

International Search Report, mailed Jul. 24, 2002 in International Patent Application No. PCT/EP02/03169.
International Search Report, mailed Oct. 1, 2002 in International Patent Application No. PCT/US02/09158.
Dörband, B., Müller, H., Seitz, G., "High Precision Interferometric Measurements of Lens Elements", Fringe '97, Sep. 15–17, 1997, Breman, Germany, pp 474–475.

Primary Examiner—Frank G. Font
Assistant Examiner—Andrew H. Lee
(74) Attorney, Agent, or Firm—Francis J. Caufield

(57) ABSTRACT

Interferometric apparatus and methods for reducing the effects of coherent artifacts in interferometers. Fringe contrast in interferograms is preserved while coherent artifacts that would otherwise be present in the interferogram because of coherent superposition of unwanted radiation generated in the interferometer are suppressed. Use is made of illumination and interferogrammetric imaging architectures that generate individual interferograms of the selected characteristics of a test surface from the perspective of different off-axis locations of illumination in an interferometer and then combine them to preserve fringe contrast while at the same time arranging for artifacts to exist at different field locations so that their contribution in the combined interferogram is diluted.

14 Claims, 11 Drawing Sheets

SINGLE RING

MULTIPLE RINGS

11a

11e

OR ● POINT

11b

OR ● POINT

11f

11c

11g

OR ● POINT

11d

OR ● POINT

11h

APPARATUS AND METHOD(S) FOR REDUCING THE EFFECTS OF COHERENT ARTIFACTS IN AN INTERFEROMETER

BACKGROUND OF THE INVENTION

This invention in general relates to interferometric apparatus and methods and in particular to the construction and use of light sources by which coherent artifacts that would otherwise be present in an interferogram can be suppressed to improve the overall signal to noise ratio.

Optical systems of all types are adversely affected by background light, ghost reflections, and/or unwanted light scattered from elements in an optical assembly, and many techniques have been developed (such as baffles and apertures) to limit the degree to which such undesired light reaches an image. If the optical system uses incoherent light, the background simply adds to the overall light level at the image. In photographic systems, such light may be characterized as veiling glare which operates to reduce contrast in the final photograph. Another common example is the reduction in visibility an automobile driver experiences in viewing through a dirty windshield where scattering operates to generate an overall glare that reduces the contrast in the surrounding landscape.

However, if the optical system uses coherent radiation (e.g., laser light), as is the case with many types of interferometers, scattered light can coherently interfere in the interferometric image to produce large amplitude light level changes with a spatial and/or temporal structure that can completely mask the desired interference pattern. The extreme sensitivity of these interferometers make them adversely affected by even the slightest background that can be produced by the smallest of imperfections in any practical system. Dust or tiny scratches on the optical surfaces of the system, or even variations in the antireflection coatings, are but a few examples of imperfections that can be problematic. Collectively, these flaws are often called optical artifacts, and when observed in coherent optical systems, are known as coherent artifacts.

A commonly used commercial interferometer geometry is known as the Fizeau geometry. The Fizeau geometry has many advantages: the optical system is common path; it has a minimum number of optical components; and is highly manufacturable. However, the unequal path design forces the use of coherent light sources. Hence, light from all locations in the system optics and interferometer, including scattering from small surface defects such as scratches, pits or dust (or volume defects such as bubbles) can influence the interferogram. These defects act as light scattering centers, producing characteristic ring patterns called Newton rings or "Bulls-eye" patterns that can imprint onto the measured phase map, affecting the extracted surface topography. Even the spurious micro-roughness of good polished surfaces and antireflection coatings contribute to the micro-shape of the wavefronts in the interferometer, and since the wavefronts are no longer common path in such a lateral scale of roughness, they establish themselves in the final measured wavefronts.

One common practice that is responsible for introducing artifacts is the use of commercially available optical components that have not been specifically designed for use in interferometer configurations and light sources with minimization of artifacts in mind yet possess other properties that make their use commercially attractive for economic reasons. Off-the-shelf lenses, for example, often possess desirable performance specifications in terms of aperture, field, focal length, and aberration control, but may have interior structure that, while suitable for other applications, introduce unwanted artifacts in interferometers.

One well-known method for reducing the effects of coherent artifacts in interferometers is to use a spatially extended source, typically in the shape of a disk. However, the spatial coherence of the source is compromised with an extended source resulting in the production of visible interference fringes for only a limited range of interferometer lengths determined by the source diameter.

Accordingly, a primary object of this invention is to describe a new extended source geometry that does not suffer from the contrast degradation of conventional extended sources yet provides excellent suppression of unwanted interference from surfaces and objects far from the object of interest to improve the accuracy and resolution of surface profiling using phase-shifting interferometry.

Another object of the invention is to provide a convenient way to modulate the phase of the interference, further benefiting particular applications developed for phase shifting interferometry.

Yet another object of the invention is to provide a way to suppress interference from surfaces parallel to the surface of interest, such as in the measurement of one surface of parallel flats.

It is yet another object of the invention to provide a source for reducing the effects of artifacts in interferometers using off-the-shelf components.

It is still another object of the invention to provide a source for use in reducing artifacts in unequal path length interferometers such as, for example, Fizeau, Mirau, and Twyman-Green types.

Other objects of the invention will, in part, be obvious and will, in part, appear hereinafter when the description to follow is read in conjunction with the drawings.

SUMMARY OF THE INVENTION

Generally, the present invention relates to interferometric apparatus and methods for preserving fringe contrast in interferograms while suppressing coherent artifacts that would otherwise be present in the interferogram because of coherent superposition of unwanted radiation generated in the interferometer. Several different embodiments of the invention achieve this result through the use of illumination and interferogrammetric imaging architectures that generate individual interferograms containing the same phase information of preselected characteristics or properties of a test surface (e.g., wavefront, topography) from the perspective of different off-axis points of illumination in an interferometer. Such individual interferograms are combined to preserve fringe contrast while at the same time arranging for artifacts to exist at different field locations so that their contribution in the combined interferogram is diluted. Thus, the same phase differences in the interferometer, corresponding to specific locations on a test surface, are mapped through optics along different light paths.

One embodiment of the invention comprises an illumination mechanism producing an extended source structure, e.g., in the shape of a thin ring of nominally constant radius that is nominally centered around an interferometer system optical axis. The ring defines the interferometer source plane. The interferometer system projects the source illumination into an interferometer where the illumination is split into two separate illumination paths. The illumination from the two separate paths is recombined after exiting the interferometer and is projected onto a detector at an image plane where the interferogram is detected and subsequently analyzed.

In another embodiment, a point source is moved in a source plane in a manner so as to describe a circle of constant radius about the optical axis in less than the time it takes to expose one detector frame. In this way a "virtual" ring shaped source is established.

In yet another embodiment, the radius of the source ring (produced directly or virtually) is changed dynamically, in either continuous or stepwise fashion, while the detector senses the interferogram. As the ring radius changes, the phase of the interferogram changes in a predictable way, providing the ability to modulate the interferometric phase in a manner required by phase-shifting or phase-stepping interferometry applications.

In an aspect of the invention, a point source is moved laterally with respect to the optical axis, producing an interferometric phase change, while simultaneously the interferometric phase is shifted by another phase modulator so as to keep the interferometric phase nominally constant. In this way, the interferometric phase is held constant while the illumination direction changes, substantially smearing out the effects of coherent artifacts. The additional phase shift can be accomplished with a conventional mechanical translator translating one of the interferometer surfaces or by tuning the illumination wavelength.

In another aspect of the invention, one surface of a transparent flat is measured in the presence of interference from the other surface by moving a point source laterally with respect to the optical axis, producing an interferometric phase change, while simultaneously the interferometric phase is shifted by another phase modulator so as to keep the interferometric phase of the interferogram produced by the desired surface of the flat nominally constant during the time it takes to expose one detector frame. In this way, the interferometric phase from the desired surface is held constant while the interferometric phase from the other surface changes substantially, washing out the interference fringes from the undesired surface.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral that identifies it wherever it appears in the various drawings and wherein.

DETAILED DESCRIPTION OF THE INVENTION

The present invention generally relates to interferometric apparatus and methods for preserving fringe contrast in interferograms while suppressing coherent artifacts that would otherwise be present in the interferogram because of coherent superposition of unwanted radiation generated in the interferometer. Several different embodiments of the invention achieve this result through the use of illumination and interferogrammetric imaging architectures that generate individual interferograms of test surface properties of interest from the perspective of different points of illumination that all are distant from its optical axis, i.e. off-axis. These individual interferograms are then combined to preserve fringe contrast in an integral interferogram while at the same time arranging for artifacts to exist at different field locations so that the contribution of artifacts in the combined interferogram is diluted, measured, or averaged out. Thus, the same phase differences in the interferometer corresponding to specific locations on a test surface are mapped through optics along different light paths. The invention includes other features for phase modulation that make it amenable for use with phase-shifting and phase-stepping interferometry techniques.

To understand the operation of the invention, it will be useful to first examine the nature of the source it employs to generate individual interferograms and how the phase information contained in each of those individual interferograms is substantially identical so that they can be beneficially combined while suppressing artifacts.

Any extended source can be thought of as a large number of physically separate point sources. From the perspective of each source point, the position of an artifact shifts in the field due to parallax. Therefore, a properly imaged final interferogrammetric image can be made to be the sum of images from individual interferograms corresponding to all the point sources, effectively smearing out the interference patterns stemming from the artifact. However, unlike typical extended sources, the source of the invention maintains good fringe contrast by assuring that the interferograms produced by each source point are identical (i.e., their optical path differences (OPD) are the same).

Figure 1:
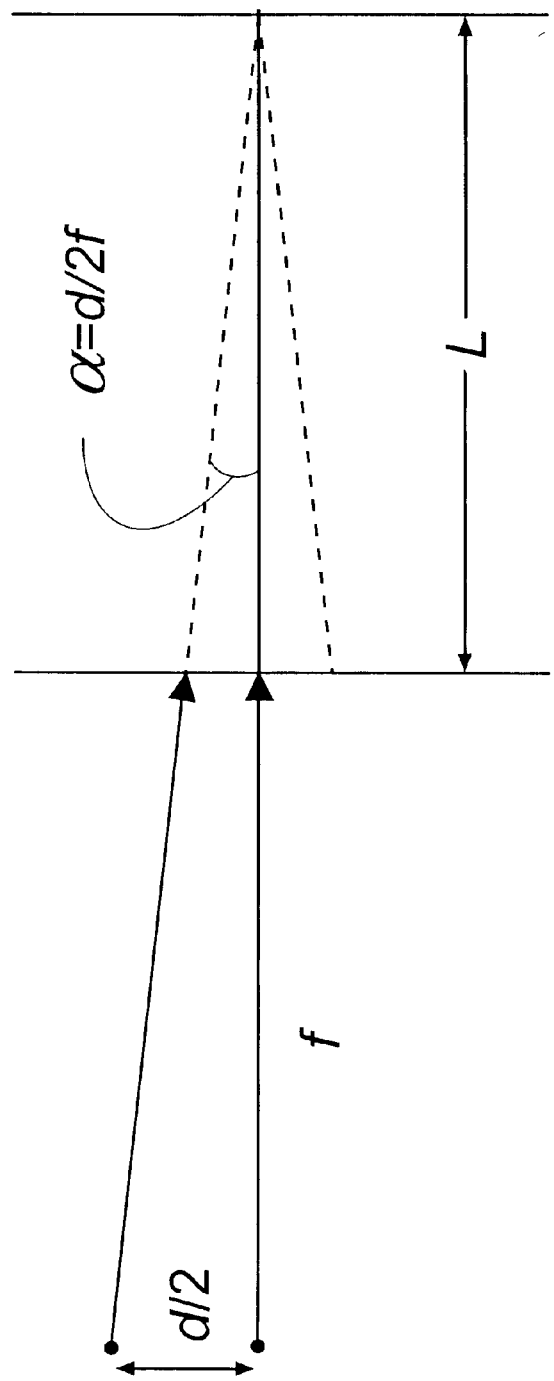
FIG. 1 is a diagrammatic view for estimating the difference in optical path distance (OPD) between interferograms produced by an on-axis test point with illumination from a source point on the edge of a source disk of diameter, d, and a source point at the center of the disk (on-axis). The on-axis source point path produces the solid on-axis (covered twice) line, while the off-axis source point produces the path shown by the dotted line.

To understand the difference between the inventive source and typical extended sources, it is useful to examine the properties of a typical disk source centered on the optical axis. Such a disk source does not fulfill the requirement met by the invention since source points at different positions along a radius of the disk produce different interferograms. This can be easily demonstrated by comparing the OPDs for a particular position on the test surface from a source point situated at the center of the disk (on-axis) and a source point on the edge of the disk. Assume for convenience an interferometer with a Fizeau geometry as shown in FIG. 1, a circular extended source of diameter d, an interferometer length L and collimator focal length f. For this fixed configuration, it can be shown that the difference, $\Delta$, in the OPDs is given approximately by:

$$\Delta \approx 2\sqrt{L^2 + \left(\frac{d}{2f}L\right)^2} - 2L \approx \frac{L}{4}\left(\frac{d}{f}\right)^2 \quad (1a)$$

Clearly, $\Delta$ increases rapidly with d, meaning that the contrast of the interferogram drops rapidly as the disk diameter grows. The following discussion along with FIG. 2 explains in detail why this is so and under what conditions this contrast reduction can be minimized.

Figure 2:
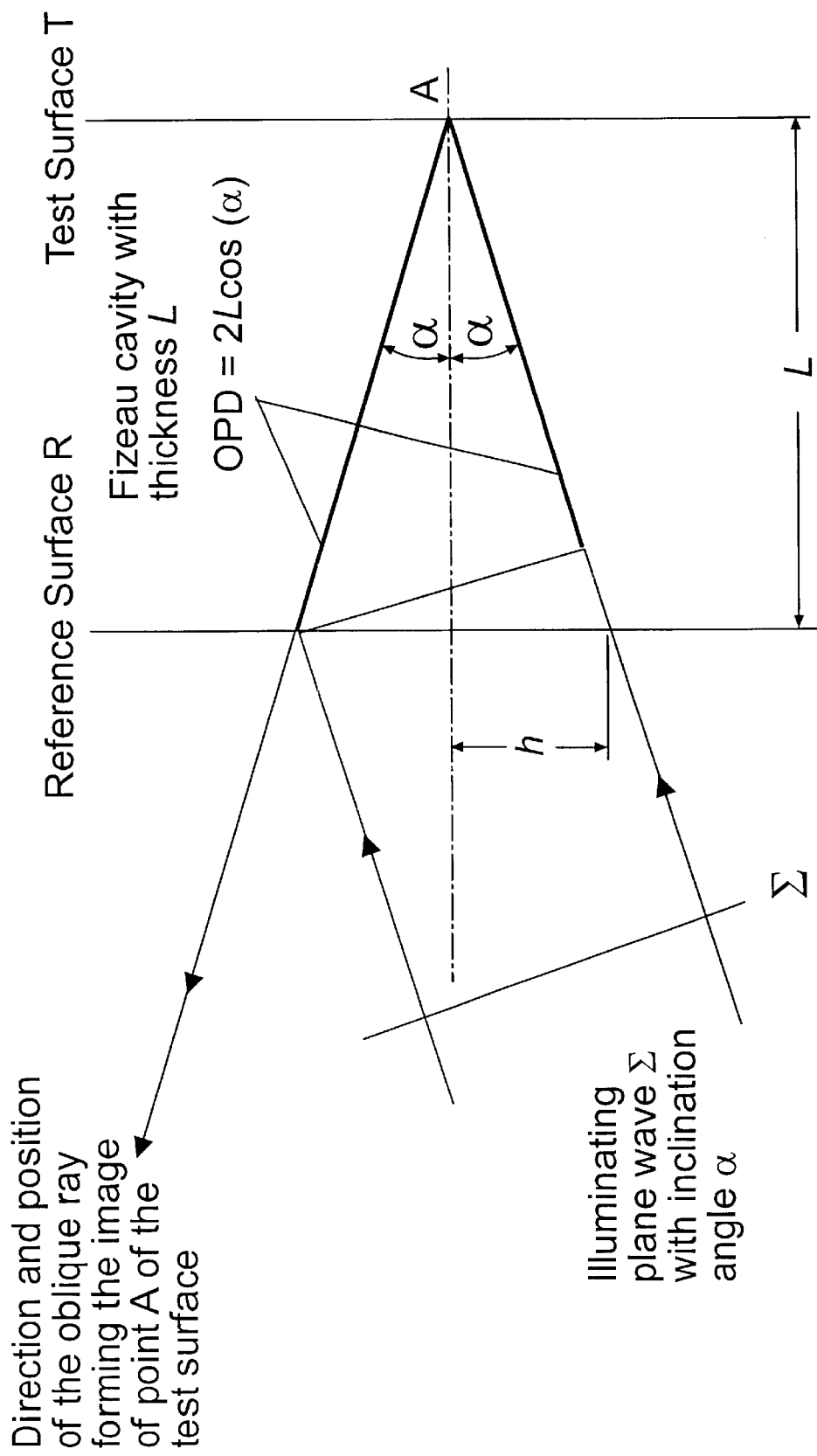
FIG. 2 is a diagrammatic illustration showing how the OPD in a Fizeau interferometer filled with air gets smaller as the angle of incidence, α, increases where the thickness of the air gap is L.

Considering now the optical system depicted in FIG. 2 where an illuminating plane wave, $\Sigma$, impinges on a Fizeau interferometer of length, L, with an inclination angle, $\alpha$. The Fizeau interferometer is built from the reference surface, R, and the test surface, T, and the intervening space is filled with air. The front and back surfaces of the plates carrying the reference surface and the test surface, R and T, respectively, are omitted to simplify matters. The test surface T carries a point A, for which the oblique ray, which is the center ray for the imaging of point A, onto a CCD detector is shown. The CCD detector itself, as well as all the other optical elements comprising the interferometer, are shown in FIG. 5, and will be discussed in further detail later.

Figure 5:
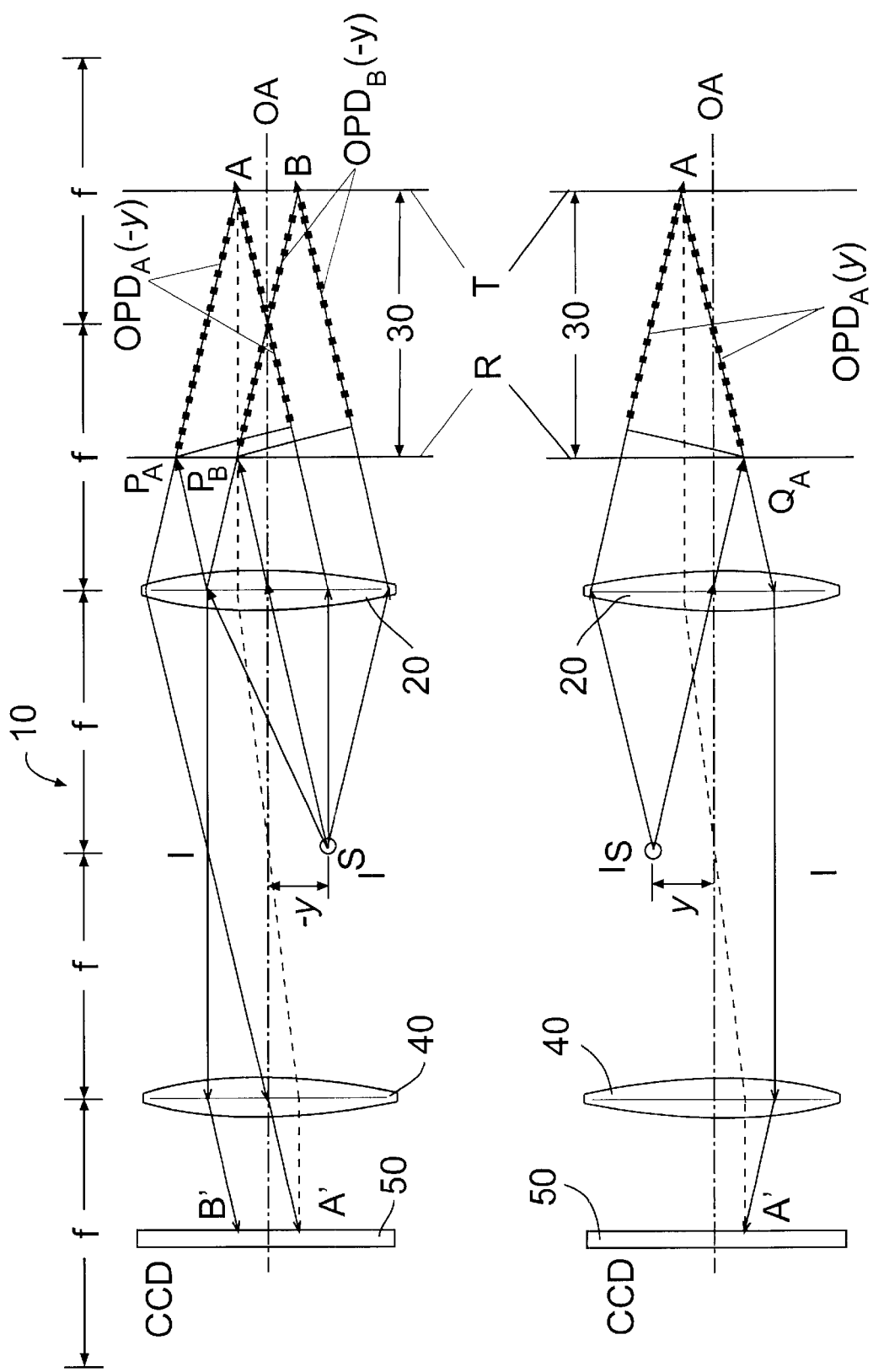
FIG. 5 is a diagrammatic elevational view of an embodiment of the invention showing a light source S, collimation and imaging optics, CCD detector, and Fizeau interferometer where object points A and B are imaged into image points A' and B'; A and B being located at a test surface plane T, and A' and B' being located at the CCD detector plane where the light source is shown in different positions with respect to the optical axis, OA. In the upper sketch, it is shifted from the axis to an off-axis distant position that is below the optical axis, and in the lower sketch by the same amount, but above the optical axis. The OPD is identical in both cases with the different object-points A and B having the same OPD as well.

It can seen from FIG. 2 and FIG. 5, that different rays from the illuminating plane wave $\Sigma$, which originally have a lateral distance of 2 h at the reference surface, will combine after reflection from the reference surface and the test surface, respectively, to finally give rise to the wanted interference effect on the detector. It should be noted that these two rays, after reflection on the two surfaces (inbound rays) are common path through the whole instrument until the detector, as long as the two surfaces are adjusted to be parallel. Ideally, all imperfections of the optical surfaces therefore have the same influence on both rays and do not show in the interference pattern. This fortunate behavior is not true if the rays deviate from each other by a very slight amount, which occurs when the interferometer is not perfectly nulled or the test piece has some deviation from planeness. This is the general case, and for this case, the invention provides an improvement in the quality of measurement.

The phase-difference, $\phi$, which is decisive for the final interference pattern on the detector, is a function of the optical path difference (OPD) within the Fizeau interferometer as well as of the wavelength of the light. The OPD is defined by the distance, L, of the two surfaces comprising the interferometer, as well as the inclination angle, $\alpha$, of the illuminating beam. The following holds:

$$\varphi = \frac{2\pi}{\lambda} \cdot OPD = \frac{2\pi}{\lambda} \cdot 2L\cos(\alpha) \quad (1b)$$

In total, the phase-difference, $\phi$, is a function of the wavelength, $\lambda$, the thickness, L, as well as of the inclination angle, $\alpha$. The position and direction of the rays illuminating and imaging the point A through all the interferometer optics changes with the inclination angle, $\alpha$. If $\alpha$ is changed during the integration time of one camera frame, the influence of the micro roughness on all optical parts, with the exception of the test piece itself, changes rapidly and cancels out in the time-average. To have $\phi$ remain stationary while changing the inclination angle, $\alpha$, one can compensate either by adapting L or $\lambda$, as can be deduced from (1b) by a Taylor series expansion:

$$\varphi(\alpha + \Delta\alpha, \lambda + \Delta\lambda, L + \Delta L) = \quad (2)$$
$$\varphi(\alpha, \lambda, L) + \frac{\partial\varphi}{\partial\alpha}\Delta\alpha + \frac{\partial\varphi}{\partial\lambda}\Delta\lambda + \frac{\partial\varphi}{\partial L}\Delta L \rightarrow \varphi(\alpha, \lambda, L)$$

Eq. (2) is fulfilled under the condition:

$$\frac{\partial\varphi}{\partial\alpha}\Delta\alpha + \frac{\partial\varphi}{\partial\lambda}\Delta\lambda + \frac{\partial\varphi}{\partial L}\Delta L = 0 \quad (3)$$

With $$\frac{\partial\varphi}{\partial\alpha} = -\frac{2\pi}{\lambda}2L\sin(\alpha) \quad (4a)$$

$$\frac{\partial\varphi}{\partial\lambda} = -\frac{2\pi}{\lambda}\frac{2L\cos(\alpha)}{\lambda} \quad (4b)$$

$$\frac{\partial\varphi}{\partial L} = \frac{2\pi}{\lambda}2\cos(\alpha) \quad (4c)$$

Eq. (3) can be fulfilled by $$\alpha L = L \tan(\alpha) \cdot \Delta\alpha \quad (5)$$

if $\lambda$ is kept constant, or $$\Delta\lambda = \lambda\tan(\alpha) \cdot \Delta\alpha \quad (6)$$

if L is kept constant.

If $\alpha$ is changed from 0 to $\alpha_1$, then L should be changed from $L_0$ to $L_1$ according to:

$$\int_{L_0}^{L_1} \frac{1}{L} \cdot \Delta L = \int_0^{\alpha_1} \tan(\alpha) \cdot \Delta \alpha$$

$$\ln(L_1) = \ln(L_0) - \ln(\cos(\alpha_1)) = \ln\left(\frac{L_0}{\cos(\alpha_1)}\right)$$

$$L_1 = L_1(\alpha_1) = \frac{L_0}{\cos(\alpha_1)} \quad (7)$$

or similarly $$\lambda_1 = \lambda_1(\alpha_1) = \frac{\lambda_0}{\cos(\alpha_1)} \quad (8)$$

Figure 4:
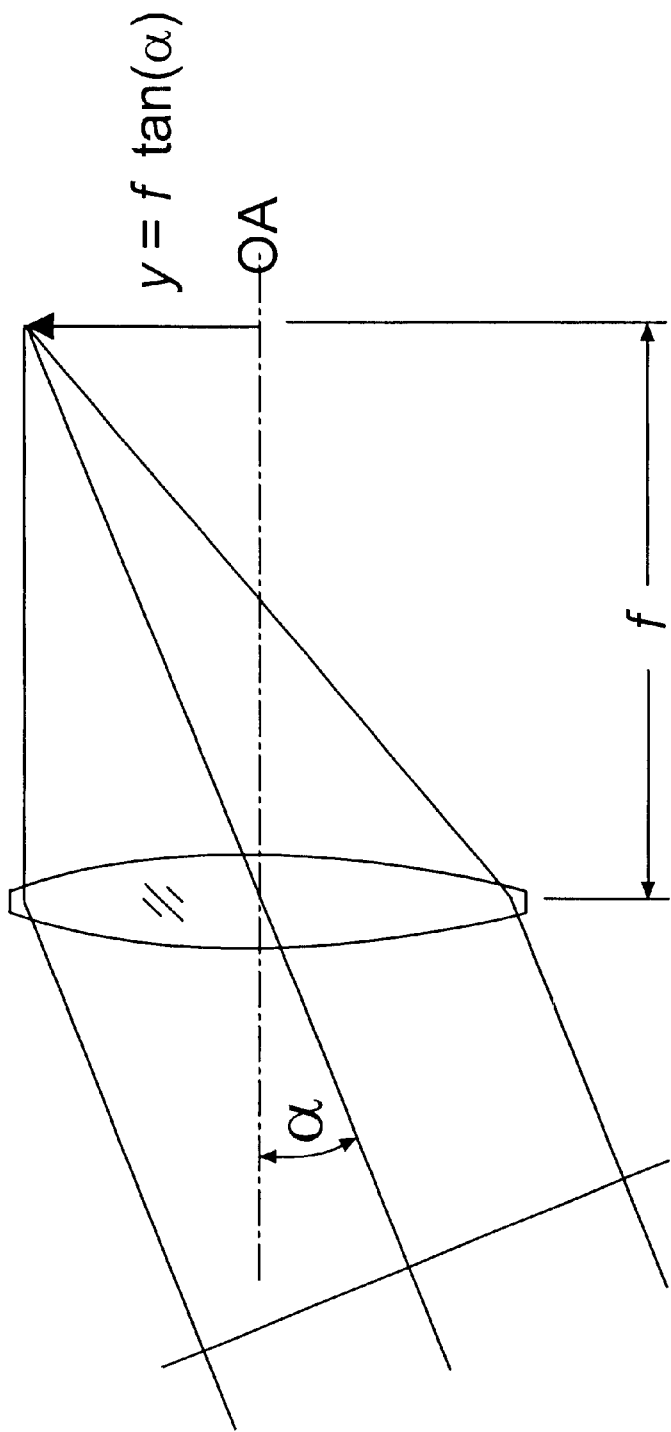
FIG. 4 is a diagrammatic illustration showing the relationship among the image height, field-angle, and focal length of a lens.

From the definition of focal length of a collimator by Gauss (see FIG. 4), it follows that:

$$y = f \cdot \tan \alpha \quad (9)$$

where y is the lateral distance of a point source from the optical axis of the collimator. Inserting (9) into (7) and (8) gives the necessary interferometer length or wavelength, respectively, when the location of the point source is shifted laterally from the on-axis position to the position y.

$$L_1(y) = L_0 \sqrt{1 - \frac{y^2}{f^2}} \quad (10)$$

$$\lambda_1(y) = \lambda_0 \sqrt{1 - \frac{y^2}{f^2}} \quad (11)$$

It can be seen from Eq. (7) and (8), that the amount and sign of the compensation to be performed is the same for both signs of the inclination angle, $\alpha$, i.e., for illumination from, for example, the two complimentary source points on either side of the optical axis shown in FIG. 5. The effect is described by $\cos(\alpha)$, which is an even function. The same is true for Eq. (10) and (11), where y is squared and therefore both sides on either side of the optical axis are equivalent for the location of the point source.

Having described several of the fundamental principles by which the invention operates, reference will now be made to the apparatus of FIG. 5 in more detail.

FIG. 5 is a diagrammatic elevational view of an embodiment of the invention designated generally as system 10. System 10 comprises a light source S, a point source such as a laser, collimation and imaging optics comprising collimation lens 20 and an objective or ocular lens 40, a CCD or other equivalent detector 50, and a Fizeau interferometer 30 where object points A and B on a test surface are imaged into image points A' and B' on the detector 50. A and B are located at a test surface plane T, and A' and B' are located at the CCD detector plane. The upper and lower sketches of FIG. 5 show the light source S in different positions both of which are distant or offset in their entirety with respect to the optical axis, OA. In the upper sketch, the light source S is shifted from the optical axis to an off-axis position below the optical axis, and in the lower sketch by the same amount, but above the optical axis. The OPD is identical in both cases with the different object-points A and B having the same OPD as well for reasons elaborated on above. The light irradiating the test surface T is collimated, and the reflected light traveling between the collimating lens 20 and the objective lens 40 is also collimated. Notice that for this type of imaging, even though only the center rays (oblique rays) are shown, all rays contributing to an image point have the same optical path length between object point and image point. In the case of an afocal system, even the optical path length between different object points in the same object plane have equal path lengths.

It should be apparent from studying FIG. 5 that the necessary compensation is independent of the sign of y, where at the upper part of FIG. 5, the location for the point source S is below the optical axis and in the lower part of FIG. 5, the location for the point source S is above the optical axis. In both cases, the OPD in the cavity is the same.

Another important fact that should also be apparent from the upper part of FIG. 5 is that, if the two surfaces comprising the Fizeau interferometer 30 are exactly parallel, then no "fringes" appear on the CCD-camera. Two points A and B are considered in the upper part of FIG. 5, and both have exactly the same OPD. In other words: the OPD does not change if point B is shifted to the position of point A. Therefore, both lay on the "same interference fringe" which is infinitely wide in this case. The same is true for the other coordinate x, which is not shown in FIG. 5. This can be deduced by considering that the plane wavefront impinging on the interferometer is perpendicular to the surfaces of the interferometer and therefore any point "above" A (above the plane of the sketch), or below A, has the same OPD as A. Therefore, what holds for point A holds true for the whole surface of T. It is now clear that the location of the point source S may describe a circle with radius r=|y| without changing the OPD of the interferometer as a whole. Any of these locations will contribute to the same, stationary interference pattern in a incoherent, but constructive, way. Therefore, all of these patterns can be accumulated on a CCD-chip during the exposure time for one frame without degrading the interference contrast or integrated by combining a series of frames by accumulating them in an adding buffer, or the like.

In the foregoing manner, means have been provided for directing radiation onto an object being studied in an interferometer from different locations that are distant with respect to an optical axis such that radiation from the locations is incident to the same points on the object along optical paths having identical path length differences in the interferometer to generate interfering wavefronts; the radiation from each location generating optical interferometric beams in which the properties of interest in the object, such as the wavefront it returns or its topography, are encoded as substantially identical phase information while the field position of phase information corresponding to artifacts differs because of different parallax perspectives from each of the different locations.

Alternatively, an extended, static ring-shaped source may be used. In this case, the "individual" interference patterns of each of the millions of points forming the extended source add up coherently, but again in a constructive fashion. Also, as will be seen, a rotating point source or laterally shifted source ("dynamic") may also be used. To form a ring source, use may be made of a point source with a holographic diffuser element, a bulk optic axicon or its diffractive equivalent. Combinations of such sources may also be beneficially used.

FIG. 5 shows that for different locations of the point source S, the whole course of the rays through the optical system is different. That is exactly the desired effect, since this is the way to overcome the coherent artifacts by effectively using an extended aperture. This property, along with the various other apparatus and methods to be described, preserves the spatial coherence with a single ring shaped source, a rotating point source, or a laterally shifted source with appropriate compensation for the variation of the OPD either by varying the interferometer length, L, or by the wavelength, λ, or both, provides an unequal path interferometer, such as a Fizeau interferometer, having high imaging quality for very fine object details as well as the very good resolution of very small surface height variations that can be achieved with equal path interferometers such as Michelson or Mirau type interferometers.

Until now, only the suppression of coherent noise was discussed. But, it is also possible, by varying the distance y of the point source S and simultaneously adjusting the OPD, to suppress the interference from an unwanted third surface within a "double" Fizeau cavity. This will be discussed with reference to FIG. 6.

Figure 6:
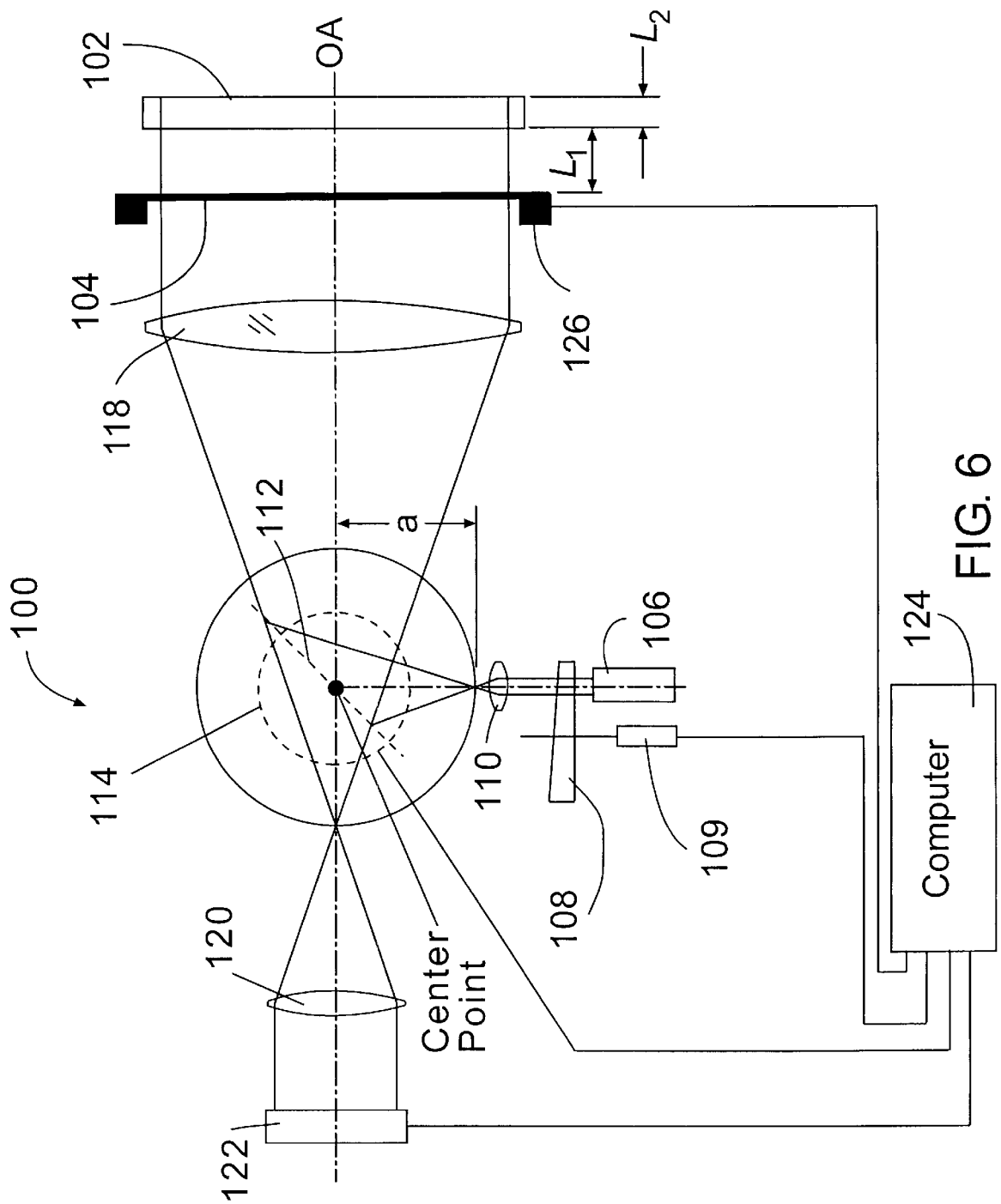
FIG. 6 is a diagrammatic elevational view of an embodiment of the invention in which a PZT, a rotatable beam splitter, and rotating wedge act as a double phase shifting means as well as a virtually extended source.

FIG. 6 is a diagrammatic elevational view of an embodiment of the invention designated generally as system 100. Generally, system 100 is a Fizeau interferometer that utilizes a PZT, a rotatable beam splitter, and rotating wedge to act in concert as a double phase shifting means as well as a "virtually extended source" in the measurement of a transparent plane parallel plate. The transparent plate to be measured is shown at 102 with a reference surface at 104. A source 106 passes through a rotating wedge 108 to be imaged on a rotatable beam splitter 112 and thereafter onto the plate 102 via imaging optics comprising converging lens 110 and collimator lens 118. A well-known rotating device 114 is responsible for selectively rotating beam splitter 112 under the control of a computer 124. Reflected light beams from the reference surface 104 and test surface 102 are imaged onto a suitable sensor 122 via collimator lens 118 and objective or ocular lens 120. The output of the sensor 122 is fed to the computer 124 for well-known phase and subsequent numerical analysis along with any image processing requirements for display and metrology purposes. Computer 124 also controls a motor 109 connected to wedge 108 for selectively rotating it, and also connects with a PZT 126 that selectively drives reference 104 to modulate it along the optical axis, OA.

As shown, three coherent waves will interfere in system 100. The first is the portion of the illuminating plane wave reflected from the reference surface 104, the second is the portion reflected from the front surface of the transparent plate 102, the third is the portion reflected from the back surface of the transparent plate 102. Because either the front surface or the back surface is to be measured at one time, the presence of the remaining reflection acts as a disturbance, and in this special case, the disturbance is of the same order of magnitude as the desired wave. The influence of this unwanted third wave can be cancelled by introducing two independent phase shifts using the components of system 100. Since at a solid plane parallel plate, it is not possible to change the relative phase of the two reflections of the front and back-surface by physical motion of one of the surfaces with respect to the other, a change in the illuminating wavelength can give the necessary degree of freedom needed to discriminate between the reflections in the final measured phase-map. The same is possible here, but the change in wavelength is now substituted with a change in the inclination angle α of the plane wave illuminating the Fizeau "double" interferometer.

Figure 3:
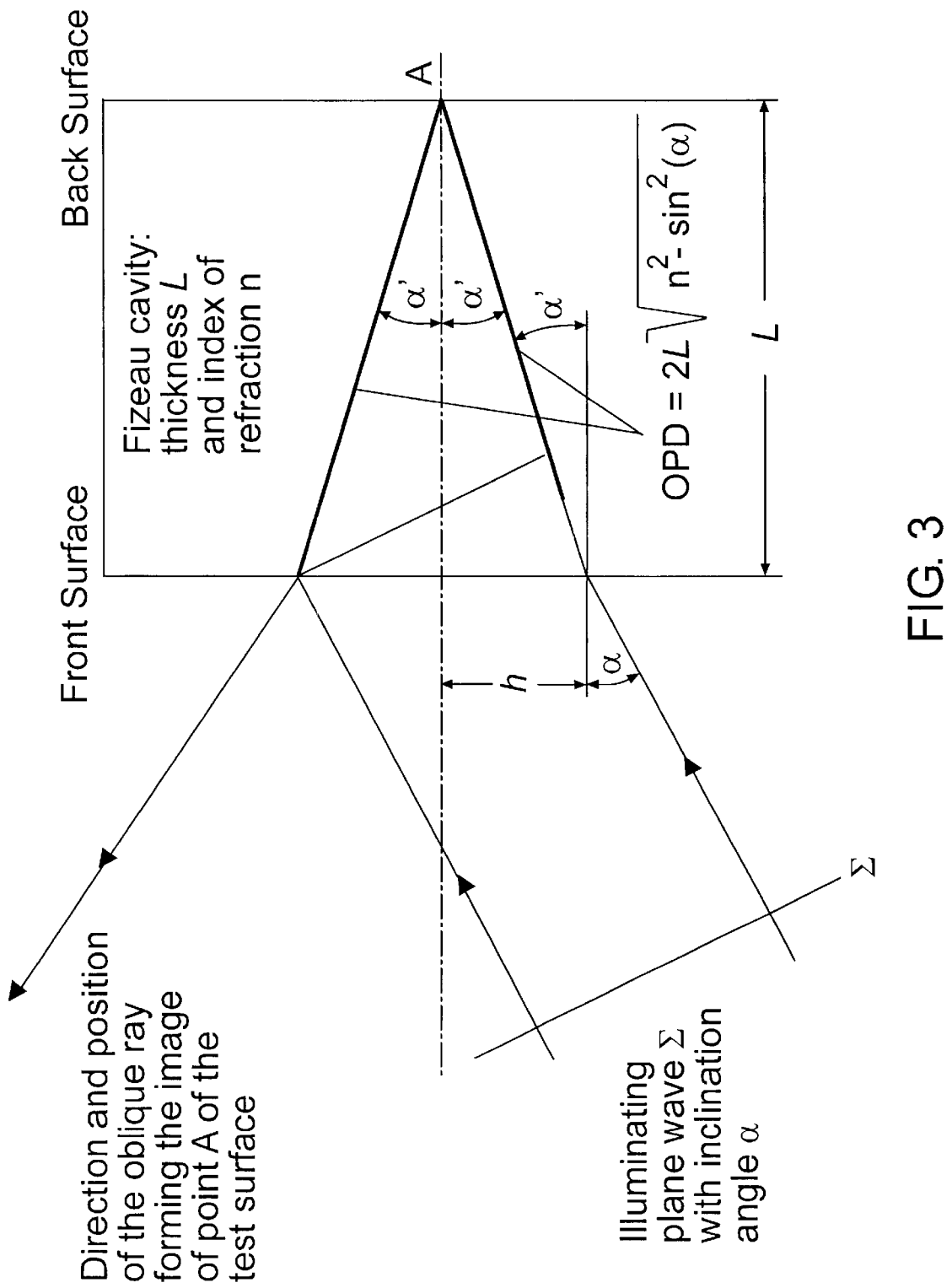
FIG. 3 is similar to FIG. 2 where the Fizeau interferometer is filled with glass of index n (plane parallel transparent plate) instead of air as in FIG. 2.

Reference is now made to FIG. 3 which shows that this inclination angle gives rise to a change in the OPD of a solid glass plate with thickness, L, and index of refraction, n, of:

$$OPD = 2L\sqrt{n^2 - \sin^2\alpha}. \quad (12)$$

For a glass-plate, for example, of L=5 mm with an index of refraction of n=1.5, α has to take on the following tabulated values for adjacent changes of the OPD of λ/2, (λ=633 nm):

|        | 0 * λ/2 | 1 * λ/2 | 2 * λ/2 | 3 * λ/2 | 4 * λ/2 | 5 * λ/2 | 6 * λ/2 |
|--------|---------|---------|---------|---------|---------|---------|---------|
| α [°]  | 0.000   | 0.558   | 0.790   | 0.967   | 1.117   | 1.248   | 1.368   |
| y [mm] | 0.000   | 4.872   | 6.890   | 8.439   | 9.745   | 10.895  | 11.935  |

The last row in the table shows the lateral shift of the point source off the optical axis that would be necessary if a collimator lens with a focal length of 500 mm were used.

A change in the inclination angle is easily produced in system 100 by changing the angle of the beam splitter 112 in FIG. 6. The beam splitter 112 is mounted on a rotation-device 114, which is controlled by the computer 124, which also acquires the detector frames for the measurement. The second, independent phase shift, which is necessary for full control in the general case, is performed by the conventional PZT-device 126, shifting the reference surface 104 along the optical axis, OA.

This example demonstrates that in many cases this invention provides a substitute for the use of a tunable light source. In FIG. 6, in addition to the rotatable beam splitter 112, a rotating glass wedge 108 is shown. Wedge 108 can be used with the beam-splitter 112 to further reduce coherent noise, as described before. In that case, the virtual orbits of the light source around the optical axis may describe ellipses, where one axis is given by the wedge-angle and is fixed, and the other axis of the ellipse is defined by the angular movement of the beam splitter 112 and can be controlled to fit the needs for suppressing the unwanted influence of one of the surfaces of the parallel plate.

Figure 7A:
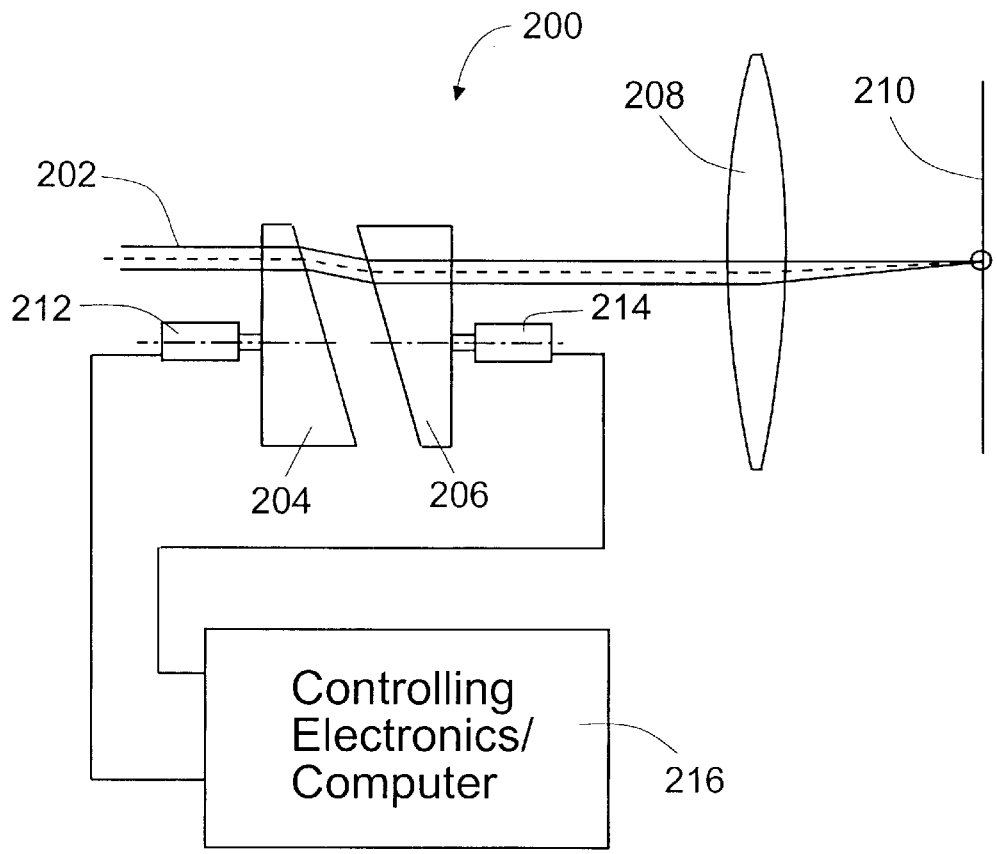
FIG. 7A is a diagrammatic elevational view of another embodiment of the invention in which two wedges in series, controlled by special electronics or a computer, describe a multiple of patterns in the focal plane of a lens, e.g., circles with different diameters, ellipses with different small and long axes, lines of different orientations.

Another very favorable solution is to use two wedges in sequence as shown in FIG. 7A in which a diagrammatic elevational view of another embodiment of the invention appears designated generally as system 200. In system 200, two wedges in series, controlled by dedicated electronics or a computer, describe a multiple of patterns in the focal plane of a lens, e.g., circles with different diameters, ellipses with different minor and major axes, and lines of different orientations, all of which can be driven synchronously together and also synchronized with the camera frames while at the same time having their angular phase relation altered, also under control of the computer 216.

Figure 7B:
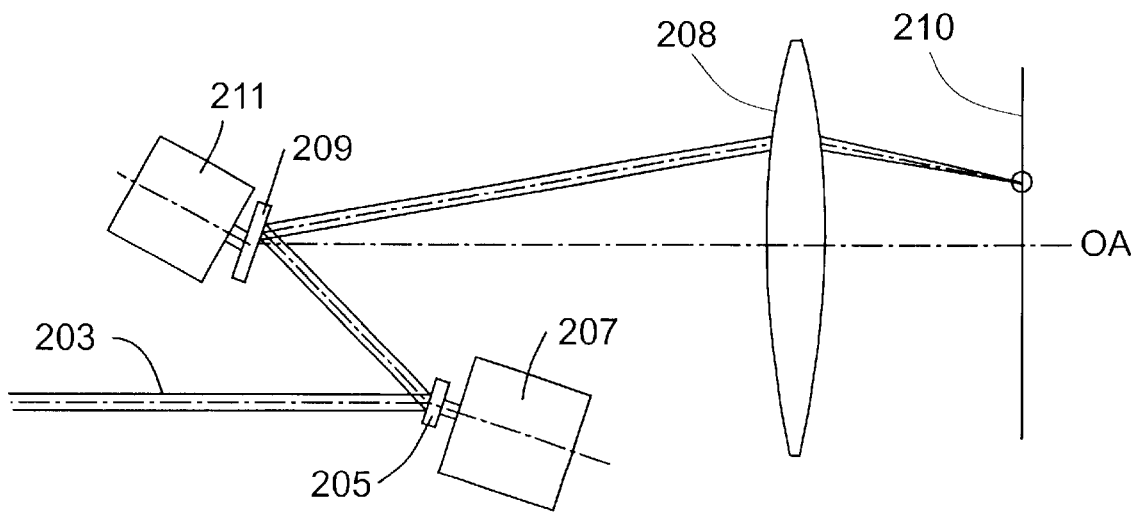
FIG. 7B is a diagrammatic elevational view of another embodiment of the invention in which two mirrors provide results equivalent to those of the embodiment of FIG. 7A.

As seen in FIG. 7B, system 200 comprises a light bundle 202 provided in any well-known manner, a pair of series mounted rotatable wedges 204 and 206 driven, respectively, by motors 212 and 214, both under the control of a computer 216 or other suitable control electronics. Light bundle 202 is selectively deviated by wedges 204 and 206 in accordance with their relative positions and angular speed of rotation, and is subsequently focused to a focal plane 210 via a lens system 208 that is diagrammatically shown. The image of the light bundle 202 in the focal plane 210 may now be used as the extended interferometer source to suppress artifacts while enhancing signal to noise performance in the interferogram.

If wedges 204 and 206 have the same wedge angle, they can be adjusted to cancel their effect, i.e., the focused point remains on the optical axis while the wedges are spinning synchronously. But if the wedges are rotated by 180° with respect to each other, their effects are added and the point describes a circle with a maximal radius. Intermediate positions of the relative rotation of the wedges 104 and 106 can operate to provide any radius r between zero and $r_{max}$. Well defined, discrete radii are needed for the case of canceling out one wave and at the same time reducing coherent noise. It should also be apparent that pairs of reflective scanning mirrors rotatable about mutually perpendicular axes can be used in system 200 for this purpose or in system 100 of FIG. 6 for similar reasons. In the foregoing manner, phase shifting is managed by changing the phase of the rotation of motors 212 and 214 with respect to one another.

FIG. 7B is an embodiment employing two mirrors in a row by which phase-shifting can be managed by changing the phase of the rotation of motors on which the mirrors are mounted. Here, mirrors 205 and 209 are mounted for rotation on motors 207 and 211, respectively. The surfaces of the mirrors 205 and 209 are made to be not perpendicular to the optical axis (mirror "wedges"). Thus, an incoming beam 203 follows a cone like output as in the case of the wedges above and is dependent on the relative phase of the motors 207 and 209. This effect can be cancelled or added by the two mirrors in a row, so the mirrors are fully equivalent to the above wedges in transmission.

Figure 8:
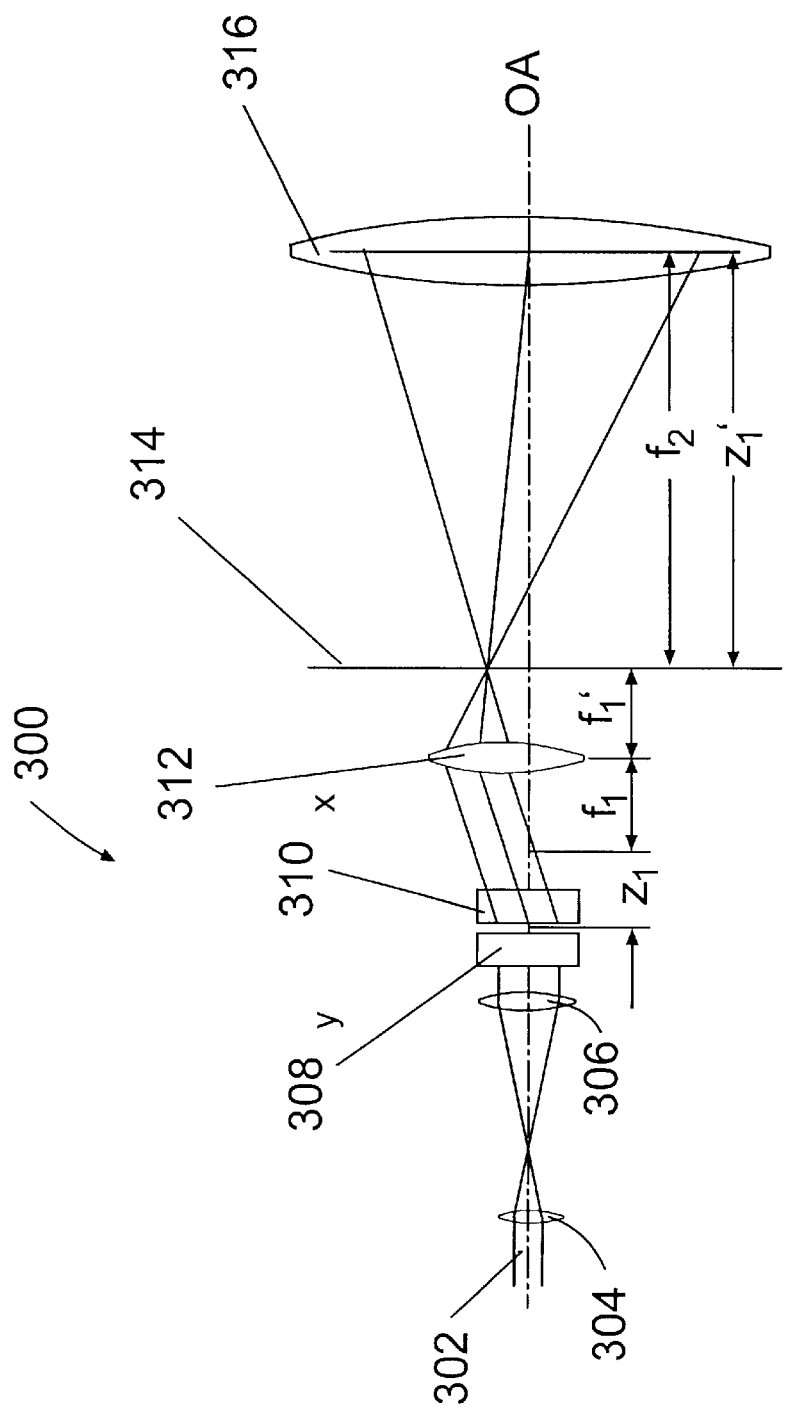
FIG. 8 is a diagrammatic elevational view of yet another embodiment of the invention in which two acousto-optic modulators (AOMs) in series are selectively modulated to provide desired illumination.

FIG. 8 is a diagrammatic elevational view of yet another embodiment of the invention in which two acousto-optic modulators (AOMs) in series are selectively modulated to provide desired illumination. As seen in FIG. 8, this embodiment is diagrammatically shown as system 300 which comprises an input beam 302 that is brought to focus on the optical axis by a converging lens 304. Beyond the focus following converging lens 304, the beam 302 is collimated by collimating lens 306 after which it is fed to a pair of series arranged acousto-optic modulators 308 and 310. Upon emerging from acousto-optic modulator 310, beam 302 is refocused by an objective lens 312 to focal plane 314 after which it re-expands to serve as the input to a collimator lens 316. The output of collimator lens 316 then serves as the illumination or irradiation source for a downstream interferometer as before.

Acousto-optic modulators, 308 and 310, are arranged in series so that one of them deflects the transmitted beam in the zy-plane, and the other in the zx-plane. When both are synchronized and one is treated with a modulated signal according to A·cos(2πvt), the other according to A·sin(2πvt), a circle with radius, r, is described at the focal plane 314 of the collimator lens 316. This radius r can be changed by the amplitude A of the modulation of the AOMs. When r is changed, the phase in the Fizeau interferometer is changed too, as described previously. The frequency, v, of the modulation can be synchronized with the frame rate of the camera, i.e. the time-constant $$T = \frac{1}{v}$$

can be made equal to the frame rate. In the case that T is chosen to be much less than the frame rate, the amplitude can be changed and within one frame rate lasting the total exposure time for the CCD-camera of $T_c$ ms, m different values for the amplitude A can be realized. These may be the values $A_1, A_2, \ldots A_m$, giving rise to the radii $r_1, r_2, \ldots r_m$ in the focal plane 314 of the collimator lens 316 and lasting for the time-periods of $T_1, T_2, \ldots T_m$, with the condition that $T_1+T_2+\ldots+T_m=T_c$. It will be evident that acousto-optic modulators 308 and 310 may be replaced with electro-optic modulators to provide similar functionality.

It is not necessary to use a strict point-source in the scanning case since better results may be obtained in using a small spot, like a multimode fiber or a convergent or divergent beam slightly out of focus and falling onto a rotating ground glass.

For the realization of an extended, ring shaped light source, a convergent beam passing through an axicon or diffractive diffuser (such as those commercially available from MEMS Optical, Inc., Huntsville, Ala., US) can provide an elegant solution as already mentioned. If the axicon or diffractive diffuser is shifted axially, the diameter of the ring is changed. Such movement, as will be described in further detail hereinafter, is depicted in FIG. 10 by a vertically extending double arrow 509 overlying a holographic diffuser 506.

Another solution is to use a fiber bundle, which has a circular entrance side but a ring shaped exit side. Yet another solution is use a spatial modulator, such as a liquid crystal display, in combination with a source to selectively transmit only those parts of the input that are needed to define a desired output geometry. In addition, a multimode fiber properly excited by an entering source can be used to generate a ring source or ring source of variable radius.

Figure 9:
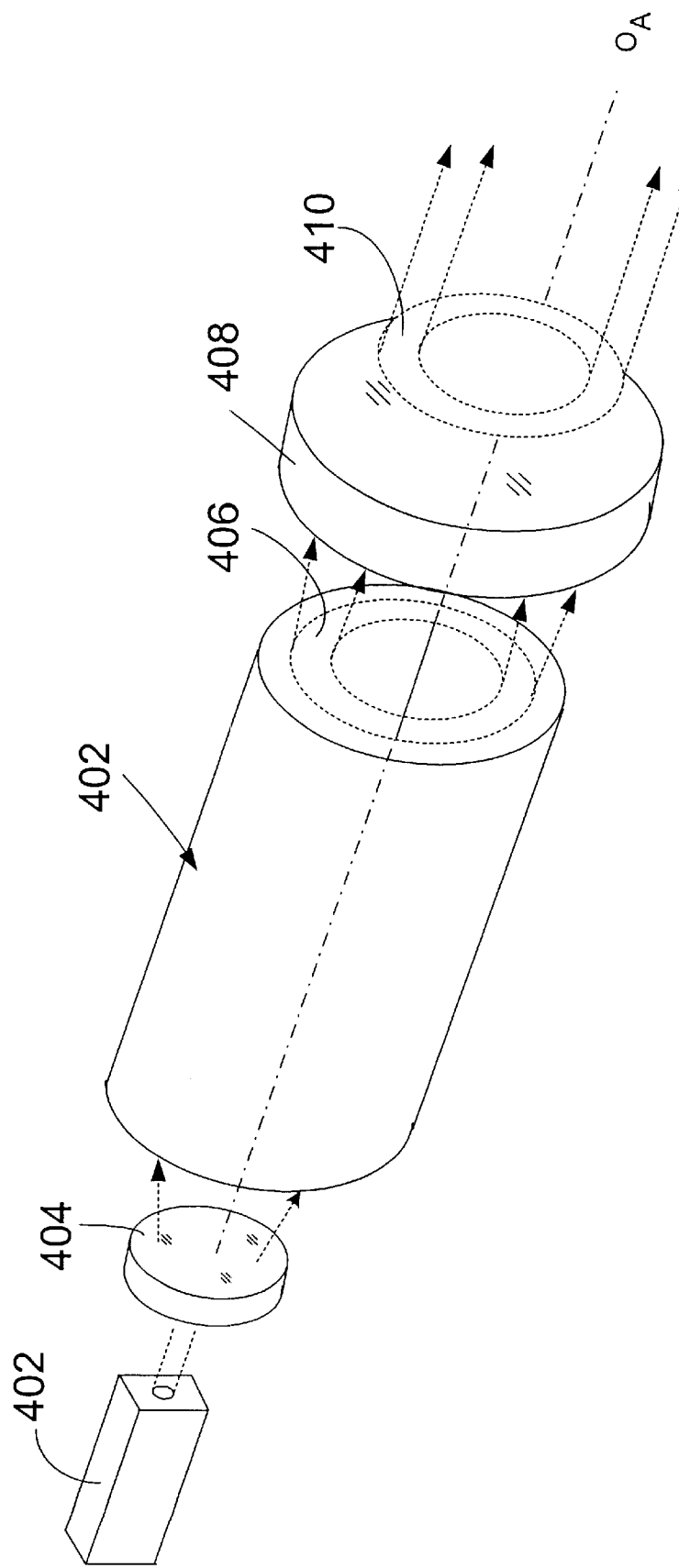
FIG. 9 is a diagrammatic perspective view of an embodiment of a inventive illumination system employing a multimode fiber excited by a source so that the output modal pattern of the fiber is in the form of a circular ring whose diameter may be changed, e.g., by altering the angle of incidence of the excitation source.

For such a fiber arrangement reference may be had to FIG. 9 which shows multimode fiber 400 excited by a laser source 402 that is imaged onto the fiber's entrance facet via a lens system 404. Lens system 404 may be designed to control the angle of incidence and numerical aperture match to multimode fiber 400 so as to excite it in a well-known manner to generate a ring of illumination 406 that can thereafter be further controlled by following optics 408 to provide, for example, a collimated ring 410. The diameter of ring 406 may be selectively changed by varying, for example, the conditions under which the laser beam enters multimode fiber 400.

Figure 10:
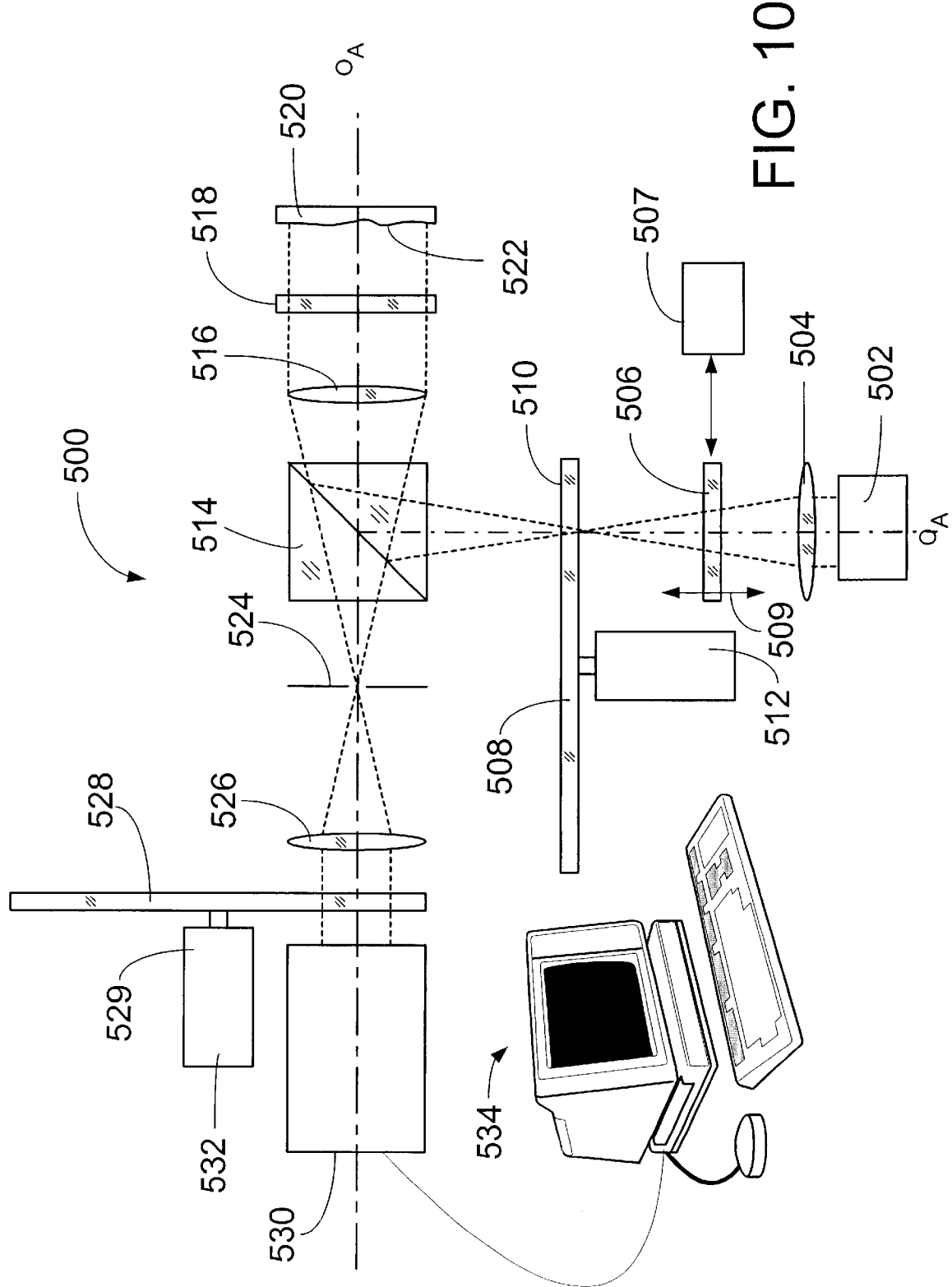
FIG. 10 is a diagrammatic elevational view of an interferometer system of the invention in which the illumination source of the invention is provided by a laser based point source with a following holographic diffuser that is used to provide a thin ring source whose diameter may be changed by selectively moving the holographic diffuser along the optical axis or, alternatively, which may be removed from the optical path altogether to provide a source for testing the homogeneity of plates located between appropriately spaced flats.

FIG. 10 shows another exemplary interferometric apparatus employing an inventive lighting arrangement. Here, an interferometer system 500 comprises a laser source 502 converged onto a holographic diffuser 506 via an objective source lens 504. Holographic diffuser 506, which is structured to receive input from the laser source 502 and convert it to a ring shape, may be moved along the axis to alter the diameter of the ring. Afterwards, the ring converges toward a rotatable diffuser disk 508 having a diffusing surface 510 structured to randomize the mutual coherence among various points on the ring. Motor 512 rotates the disk 508 for this purpose.

After the ring of illumination leaves diffuser surface 510, it expands to and impinges on the diagonal reflecting surface of a beamsplitter 514 after which it continues to diverge until it reaches a collimating lens 516. Upon leaving collimating lens 514, the beam is now planar in form and passes through a reference plate 518 and then proceeds to an object 520 having an object surface 522 to be measured. This will be recognized as the familiar Fizeau interferometer.

Return beams from the reference plate 518 and object surface 522 are combined as interfering wavefronts and are converged via collimating lens 516, through beamsplitter 514, and through an aperture 524. Afterwards, the combined wavefronts are collimated by an imaging objective 516, pass through another diffuser disk 528, which is also rotated via a motor 532, and then imaged by a zoom camera 530 having an internal detector for mapping the intensity of the resultant wavefront patterns. The output of the camera 530 is processed using a computer 534 equipped with appropriate software containing algorithms for reducing the intensity patterns using, for example, phase shifting algorithms, or the like.

A stepper motor 507, or the like, is used to selectively move the holographic diffuser 506 out of the path of the converging radiation emerging from lens 504 to form a point source on the rear surface of diffuser 508. In this manner, interferometer 500 may be converted for use for the measurement of the homogeneity of plates with high lateral resolution when such plates are placed between the reference flat 518 and another reference flat that may be used in place of object 520 and spaced appropriately as needed. When holographic diffuser 506 is taken out of the incoming source path, plane waves emanate from reference flat 518. With such plane waves, a plate can be introduced and removed from the intervening space between the reference 518 and the reference flat substituted for object 520 and comparison measurements made to assess the homogeneity of the material comprising the plate under test.

It will be noted that the geometry of interferometer 500 may easily be altered to handle spherical surfaces as well by appropriately designing the lens responsible for controlling the shape of the incoming wavefront impinging on the object and reference surfaces and that a disk may be used instead of a point source when holographic diffuser 506 is moved out of the path altogether.

It will also be evident to those skilled in the art that the function of the rotating diffusers may be beneficially combined into a single rotating diffuser appropriately located where needed or that the rotating diffuser nearest the source may be eliminated if the source is not a solid ring. Moreover, it will be evident that the rotating diffuser need be used only with a stationary ring source since optically or mechanically rotating sources automatically possess randomized mutual coherence.

Figure 11:
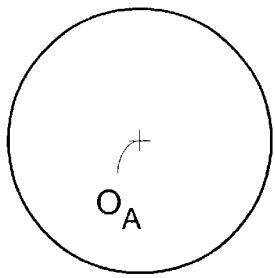
FIG. 11, comprising subfigures 11a–11h, shows various inventive source patterns employing solid and virtual single and double ring possibilities that can be used alternately with point or disk sources.
Figure 11:
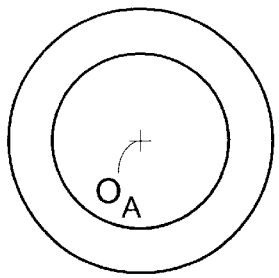
Figure 11:
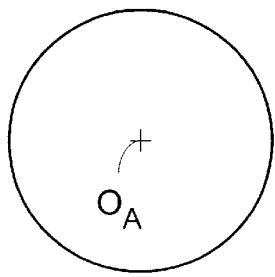
Figure 11:
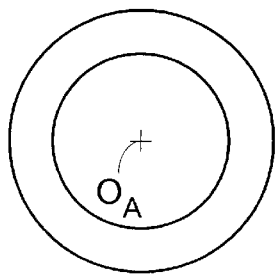
Figure 11:
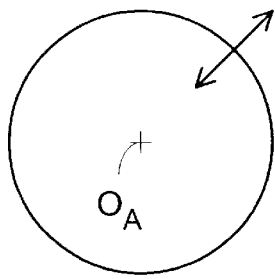
Figure 11:
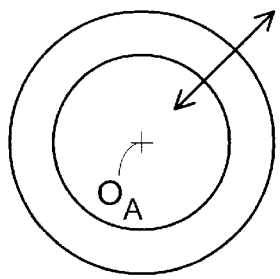
Figure 11:
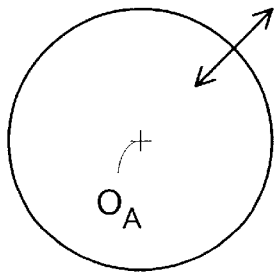
Figure 11:
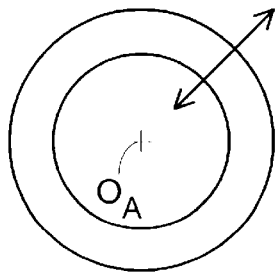

Having described various structures for providing inventive thin and virtual rings that may have their radii dynamically changed either continuously or in stepwise fashion, along with point sources, it will be useful to review the range of possible inventive source configurations by referring now to FIG. 11 and the following table:

TABLE

| 1 Ring | Multiple Rings |
|---|---|
| Fixed Radius (FIG. 11a) | Fixed radius (FIG. 11e) |
| Fixed Radius With Point Option (FIG. 11b) | Fixed Radius With Point Option (FIG. 11f) |
| Variable Radius (FIG. 11c) | Variable Radius (FIG. 11g) |
| Variable Radius With Point Option (FIG. 11d) | Variable Radius With Point Option (FIG. 11h) |

It will be clear to those skilled in the art that multiple rings other than double rings may be used and that the point sources do not necessarily need to be on the optical axis. In addition, it will be evident that the thickness of a thin ring, whether it be virtual or solid, may be readily determined with the use of Equation 1a and calculating when the phase shift created between the inner and outer diameters of the ring would exceed 180°, thus resulting in destructive interference. Consequently, the thickness should be made such that this phase shift is less than 180° by an amount that is consistent with the contrast requirements of the measurements being made. The nominal diameter of the smallest ring may be determined empirically and in general depends on wavelength, interferometer length, and the proximity of the source of the artifact to the surface under test. Generally, the closer that the artifact source is to the test surface of interest, the larger will be the source diameter that is needed to suppress artifacts. If two or more rings are being used to alternately nullify and maximize contrast at different axial positions, the nominal ring diameters should generally be chosen so that the phase difference where high contrast is desired is small, and where low contrast is desired, is 180°.

From experimentation, ring diameters of 0.25 mm to 1 mm were found adequate to suppress the typical artifacts, principally from the vicinity of the beamsplitter in a breadboard interferometer, which was based on the GPI Product of Zygo Corporation, Middlefield, Conn., US and appearing diagrammatically in FIG. 10. From these results, a representative ring diameter of 1 mm has been found adequate, since this diameter did not impact on the design of a commercial collimator design used in the breadboard.

With regard to ring thickness, Equation (1a) can be used for the OPD to estimate the maximum allowable thickness as already mentioned where:

$$\Delta \approx 2\sqrt{L^2 + \left(\frac{d}{2f}L\right)^2} - 2L \approx \frac{L}{4}\left(\frac{d}{f}\right)^2 \tag{1a}$$

To find the thickness t such that the difference between the inner and outer diameters produces an OPD difference of $\lambda/2$.

$$\frac{L}{4}\left(\frac{d+t}{f}\right)^2 - \frac{L}{4}\left(\frac{d}{f}\right)^2 \leq \frac{\lambda}{2}$$

Solving for t it follows that:

$$t = \frac{\lambda f^2}{Ld}$$

Using a GPI focal length of 500 mm and assuming a wavelength of 600 nm and a maximum practical interferometer length of 3 m, a thickness of about 50 microns is found from the foregoing analysis. Note that this implies a lateral misalignment tolerance of half the thickness, about 25 microns.

It should be mentioned that the invention is not restricted to the case of Fizeau interferometers, but can be applied with all other kinds of interferometers including, but not limited to, unequal path types such as the Mirau and Twyman-Green. The principle underlying the invention can equally be applied to the testing of spheres. In addition, use may be made of one or more beam steering mirrors driven by galvanometers or the like in place of rotating wedges and in-line acousto-optic and electro-optic modulators to effect beam deflections as needed.

Other changes will be obvious to those skilled in the relevant field based on the teachings and embodiments of the invention described herein and such changes are intended to be within the scope of the invention as claimed.

What is claimed is:

1. An interferometric apparatus having an optical axis, said interferometric apparatus comprising:
    means for locating an object to be measured along the optical axis;
    an optical arrangement adapted to at least in part cooperate with an object to form an interferometer and facilitate the generation of interfering wavefronts in which phase information about the object is encoded; and
    means for directing radiation onto the object to be measured from at least two different locations that are distant from said optical axis to generate interfering wavefronts corresponding to each of said locations where each wavefront contains substantially identical phase information about the object from said interferometer, wherein said radiation directing means comprises a radiation source and at least one optical component for receiving radiation from said radiation source and forming at least one thin ring of illumination all points of which are distant from said optical axis such that said two locations are encompassed by said thin ring of illumination, said radiation source comprising a light source and a holographic diffuser element illuminated by said focused light source to form said thin ring of illumination.

2. The interferometric apparatus of claim 1 wherein said holographic diffuser element is mounted for movement along said optical axis to selectively change the radius of said thin ring.

3. The interferometric apparatus of claim 1 wherein said holographic diffuser is mounted for movement transverse to said optical axis between a first position in which said thin ring of illumination is formed and a second position in which said holographic diffuser is out of the path of illumination provided by said light source.

4. An interferometric apparatus having an optical axis, said interferometric apparatus comprising:

means for locating an object to be measured along the optical axis;

an optical arrangement adapted to at least in part cooperate with an object to form an interferometer and facilitate the generation of interfering wavefronts in which phase information about the object is encoded; and means for directing radiation onto the object to be measured from at least two different locations that are distant from said optical axis to generate interfering wavefronts corresponding to each of said locations where each wavefront contains substantially identical phase information about the object from said interferometer, wherein said means for directing radiation comprises a point source and an arrangement for optically rotating said point source around said optical axis at a predetermined rate such that radiation emanating from said point source appears to be originating from said two different locations, said arrangement comprising a pair of serially arranged acousto-optic modulators.

5. An interferometric apparatus having an optical axis, said interferometric apparatus comprising:

means for locating an object to be measured along the optical axis;

an optical arrangement adapted to at least in part cooperate with an object to form an interferometer and facilitate the generation of interfering wavefronts in which phase information about the object is encoded; and means for directing radiation onto the object to be measured from at least two different locations that are distant from said optical axis to generate interfering wavefronts corresponding to each of said locations where each wavefront contains substantially identical phase information about the object from said interferometer, wherein said means for directing radiation comprises a point source and an arrangement for optically rotating said point source around said optical axis at a predetermined rate such that radiation emanating from said point source appears to be originating from said two different locations, said arrangement comprising a pair of serially arranged electro-optic modulators.

6. An interferometric apparatus having an optical axis, said interferometric apparatus comprising:

means for locating an object to be measured along the optical axis;

an optical arrangement adapted to at least in part cooperate with an object to form an interferometer and facilitate the generation of interfering wavefronts in which phase information about the object is encoded; and means for directing radiation onto the object to be measured from at least two different locations that are distant from said optical axis to generate interfering wavefronts corresponding to each of said locations where each wavefront contains substantially identical phase information about the object from said interferometer, wherein said means for directing radiation comprises a point source and a fiber face plate having an input end for accepting radiation from said point source and an output end arranged so that radiation emanating from said point source appears to be originating from said two different locations.

7. The interferometric apparatus of claim 6 wherein said output end of said fiber face plate is arranged so that the output therefrom is in the form of at least one ring.

8. An interferometric apparatus having an optical axis, said interferometric apparatus comprising:

means for locating an object to be measured along the optical axis;

an optical arrangement adapted to at least in part cooperate with an object to form an interferometer and facilitate the generation of interfering wavefronts in which phase information about the object is encoded; and means for directing radiation onto the object to be measured from at least two different locations that are distant from said optical axis to generate interfering wavefronts corresponding to each of said locations where each wavefront contains substantially identical phase information about the object from said interferometer, wherein said means for directing radiation toward an object comprises means for assuring that radiation emanating from said two locations is substantially mutually incoherent with respect to one another.

9. The interferometric apparatus of claim 8 wherein said means for assuring that radiation emanating from said two locations is substantially mutually incoherent with respect to one another comprises at least one rotating diffuser positioned along the optical axis.

10. An interferometric method for use with an interferometer having an optical axis, said interferometric method comprising the steps of:

locating an object to be measured along the optical axis;

providing an optical arrangement adapted to at least in part cooperate with an object to form an interferometer and facilitate the generation of interfering wavefronts in which phase information about the object is encoded; and directing radiation onto the object to be measured from at least two different locations that are distant from said optical axis to generate interfering wavefronts corresponding to each of said locations where each wavefront contains substantially identical phase information about the object from said interferometer, wherein said radiation directing step comprises forming at least one thin ring of illumination all points of which are distant from said optical axis such that said two locations are encompassed by said thin ring of illumination, said thin ring of illumination being formed by directing light onto a holographic diffuser element.

11. The interferometric method of claim 10 further including the step of moving said holographic diffuser element along said optical axis to selectively change the radius of said thin ring.

12. The interferometric method of claim 10 further including the step of moving said holographic diffuser element transverse to said optical axis between a first position in which said thin ring is formed and a second position in which said holographic diffuser is out of the path of illumination provided by said directed light.

13. An interferometric method for use with an interferometer having an optical axis, said interferometric method comprising:

locating an object to be measured along the optical axis;

providing an optical arrangement adapted to at least in part cooperate with an object to form an interferometer and facilitate the generation of interfering wavefronts in which phase information about the object is encoded; and directing radiation onto the object to be measured from at least two different locations that are distant from said optical axis to generate interfering wavefronts corresponding to each of said locations where each wavefront contains substantially identical phase information about the object from said interferometer, wherein said step of directing radiation toward an object comprises the further step of assuring that radiation emanating from said two locations is substantially mutually incoherent with respect to one another.

14. The interferometric method of claim 13 wherein said step for assuring that radiation emanating from said two locations is substantially mutually incoherent with respect to one another comprises rotating at least one diffuser positioned along the optical axis.

* * * * *

UNITED STATES PATENT AND TRADEMARK OFFICE
Certificate

Patent No. 6,643,024 B2                                                                                                    Patented: November 4, 2003

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Leslie L. Deck, Middletown, CT (US); Michael Küchel, Oberkochen, Germany; David Stephenson, Madison, CT (US); Edward J. Gratix, Monroe, CT (US); and Carl A. Zanoni, Middlefield, CT (US).

Signed and Sealed this Tenth Day of October 2006.

GREGORY J. TOATLEY, JR.
*Supervisory Patent Examiner*
Art Unit 2877